United States Patent
Shetty et al.

(10) Patent No.: US 12,405,514 B2
(45) Date of Patent: Sep. 2, 2025

(54) AUTOMATED PRIVACY SHUTTER CONTROL SYSTEMS AND METHODS

(71) Applicant: DISH Network Technologies India Private Limited, Bengaluru (IN)

(72) Inventors: Vikram Balaraja Shetty, Bengaluru (IN); Praveen Kumar G, Mangalore (IN); Visali Manoharan, Vangaram (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 136 days.

(21) Appl. No.: 18/189,455

(22) Filed: Mar. 24, 2023

(65) Prior Publication Data

US 2024/0264510 A1 Aug. 8, 2024

(30) Foreign Application Priority Data

Feb. 6, 2023 (IN) .............................. 202341007499

(51) Int. Cl.
 *G03B 11/04* (2021.01)
 *G06F 1/26* (2006.01)
 *G06F 21/83* (2013.01)

(52) U.S. Cl.
 CPC ............ *G03B 11/041* (2013.01); *G06F 1/266* (2013.01); *G06F 21/83* (2013.01)

(58) Field of Classification Search
 CPC .............. G03B 11/043; H04N 21/4436; G06F 2200/261
 USPC ........................................................ 307/126
 See application file for complete search history.

(56) References Cited

U.S. PATENT DOCUMENTS

| | | | | |
|---|---|---|---|---|
| 5,270,576 A | * | 12/1993 | Kahle | .................. H01H 47/001 361/186 |
| 7,548,255 B2 | * | 6/2009 | Bear | ...................... H04N 23/66 348/207.11 |
| 8,303,145 B2 | * | 11/2012 | Wilcox | ................... B63B 45/04 362/555 |
| 11,237,457 B2 | * | 2/2022 | Ushio | .................. G03B 11/043 |
| 11,656,532 B2 | | 5/2023 | Goh et al. | |
| 11,681,204 B2 | * | 6/2023 | Huang | ................. G03B 11/043 396/448 |
| 11,815,786 B2 | | 11/2023 | Sawanobori et al. | |
| 2006/0109384 A1 | | 5/2006 | Miller-Smith et al. | |
| 2009/0091192 A1 | * | 4/2009 | Robertson | ............... G06F 1/266 307/125 |
| 2014/0310744 A1 | | 10/2014 | Gelonese | |

(Continued)

FOREIGN PATENT DOCUMENTS

JP 2007243811 A 9/2007

*Primary Examiner* — Leon W Rhodes, Jr.
(74) *Attorney, Agent, or Firm* — Kilpatrick Townsend & Stockton LLP (57) ABSTRACT

Various arrangements are presented that involve an automated shutter control system being used with a separate and distinct video camera. The automated shutter control system can include a shutter, a shutter motor, power sensing circuitry that measures an amount of power being supplied to the electronic display, and a processing system. The processing system controls the shutter motor that causes the shutter to be actuated to an open position or a closed position based on the amount of power being supplied to the electronic display as measured by the circuitry of the power sensing circuitry.

20 Claims, 6 Drawing Sheets

(56) References Cited

U.S. PATENT DOCUMENTS

| | | | |
|---|---|---|---|
| 2015/0163385 A1* | 6/2015 | Haddad | G03B 17/565 348/374 |
| 2019/0045263 A1 | 2/2019 | Gatto | |

* cited by examiner

AUTOMATED PRIVACY SHUTTER CONTROL SYSTEMS AND METHODS

BACKGROUND

This application claims priority to Indian Provisional Patent Application No. 202341007499, filed on Feb. 6, 2023, the disclosure of which is incorporated by reference in its entirety for all purposes.

BACKGROUND

Network-connected video cameras provide end users with advantages, such as the ability to have remote face-to-face communications with friends, colleagues, and even strangers. However, with the prevalence of such cameras comes privacy and security concerns: a camera may be capturing and transmitting video unbeknownst to the end user. For end users having such cameras in their home or business, their privacy or security could be inadvertently or surreptitiously violated. Other potential end users may not own or install such a camera because of such concerns. Embodiments detailed herein help address these and other problems.

SUMMARY

Various embodiments are described related to an automated shutter control system for use with a video camera. In some embodiments, an automated shutter control system for use with a video camera is described. The system may comprise a shutter. The system may comprise a shutter motor that moves the shutter. The system may comprise a power system comprising a power pass-through. The power pass-through may comprise a socket configured to be connected with a power cable plug of an electronic display. The power system may comprise a plug configured to be connected with an outlet through which power may be received for the automated shutter control system and the electronic display. The power system may comprise power sensing circuitry comprising a circuitry that may measure an amount of power being supplied to the electronic display. The system may comprise a processing system, comprising one or more processors, that may be in communication with the shutter motor and the power sensing circuitry. The processing system may be configured to, based on the amount of power being supplied to the electronic display as measured by the circuitry of the power sensing circuitry, transmit a signal to the shutter motor that may cause the shutter to be actuated to an unblocked position or a blocked position.

Embodiments of such a system may include one or more of the following features: the shutter, when in the blocked position, may block a camera lens of the video camera, the video camera being separate and distinct from the automated shutter control system. The shutter, when in the unblocked position, may permit the camera lens of the video camera a field of view unobstructed by the shutter. The processing system may be further configured to receive an indication of a make and a model of the electronic display. The system may be further configured to access a data store to retrieve a threshold value mapped to the make and the model of the electronic display. The processing system may be further configured to compare the retrieved threshold value with the amount of power being supplied to the electronic display. The system may be further configured to transmit the signal to the shutter motor that may cause the shutter to be actuated to the unblocked position or the blocked position further based on comparing of the amount of power with the retrieved threshold value mapped to the make and the model of the electronic display. The amount of power may be required to exceed or not exceed the retrieved threshold value for a predefined duration of time prior to the signal being transmitted to the shutter motor that may cause the shutter to be actuated. The processing system may be further configured to perform a learning process that may comprise monitoring a power usage of the electronic display for at least a defined period of time. The processing system may be further configured to determining an active power usage value and a standby power usage value for the electronic display based on monitoring the power usage for at least the defined period of time. The processing system may be further configured to calculate a threshold value using the determined active power usage value and the determined standby power usage value. The processing system may be further configured to compare the calculated threshold value with the amount of power being supplied to the electronic display. The processing system may be further configured to transmit the signal to the shutter motor that may cause the shutter to be actuated to the unblocked position or the blocked position further based on comparing of the amount of power with the calculated threshold value. The processing system may be further configured to perform a learning process configured to cause an end user to set the electronic display to an active mode. The processing system may be further configured to perform a learning process configured to measure active power usage while the electronic display is set to the active mode. The processing system may be further configured to perform a learning process configured to cause the end user to set the electronic display to a standby mode. The processing system may be further configured to perform a learning process configured to measure standby power usage while the electronic display is set to the standby mode. The processing system may be further configured to perform a learning process configured to calculate a threshold value using the measured active power usage value and the measured standby power usage value. The processing system may be further configured to compare the calculated threshold value with the amount of power being supplied to the electronic display. The processing system may be further configured to transmit the signal to the shutter motor that causes the shutter to be actuated to the unblocked position or the blocked position further based on comparing of the amount of power with the calculated threshold value. The electronic display may be a television, the television being separate and distinct from the video camera and separate and distinct from the automated shutter control system.

In some embodiments, a method for setting up and using an automated privacy shutter control system in conjunction with a camera and display. The method may comprise installing an automated shutter control system such that a plug of the automated shutter control system may be connected with an outlet through which power may be received for the automated shutter control system and the display. The automated shutter control system may comprise a shutter. The system may comprise a shutter motor that moves the shutter. The automated shutter control system may comprise a power system, comprising a power pass-through. The power pass-through may comprise a socket configured to be connected with a power cable plug of the display. The power system may comprise power sensing circuitry comprising a circuitry that measures an amount of power being supplied to the display. The automated shutter control system may comprise connecting the socket of the automated shutter control system with a plug of a power cable of the display. The automated shutter control system may comprise performing, by the automated shutter control system, a learning process to determine whether the display is in a standby mode or an active mode. The automated shutter control system may comprise, after performing the learning process, sensing a power usage of the display. The automated shutter control system may comprise adjusting a position of a shutter of the automated shutter control system based on the learning mode and the sensed power usage of the display.

Embodiments of such a method may include one or more of the following features: the learning process may comprise receiving an indication of a make and a model of the display. The method may comprise accessing a data store to retrieve a threshold value mapped to the make and the model of the electronic display. The method may further comprise comparing the retrieved threshold value with the sensed power usage. Adjusting the position of the shutter may comprise transmitting a signal to the shutter motor that may cause the shutter to be actuated to an open position or a closed position further based on comparing the sensed power usage with the retrieved threshold value mapped to the make and model of the display. The sensed power usage may be required to exceed or not exceed the retrieved threshold value for a predefined duration of time prior to the signal being transmitted to the shutter motor. The learning process may comprise causing an end user to set the display to an active mode. The learning process may comprise measuring active power usage while the display is set to the active mode. The learning process may comprise causing the end user to set the display to a standby mode. The learning process may comprise measuring standby power usage while the display is set to the standby mode. The learning process may comprise calculating a threshold value using the measured active power usage value and the measured standby power usage value. The method may further comprise configuring a blocked shutter position in which the shutter blocks a field of view of the camera and an unblocked shutter position in which the shutter does not block the field of view of the camera. The camera may be separate and distinct from the automated shutter control system. The camera may be integrated as part of the display.

BRIEF DESCRIPTION OF THE DRAWINGS

A further understanding of the nature and advantages of various embodiments may be realized by reference to the following figures.

DETAILED DESCRIPTION

An automated shutter control system ("ASCS") can be used to help improve security and privacy when a network-connected video camera is installed. The ASCS can actuate a shutter that either obscures the field of view of the video camera or permits the video camera to see the field of view.

In order to control the shutter, rather than requiring user input as to the desired state of the shutter, the state of an electronic display device, such as a television, is sensed. Power sensing circuitry is used to determine if the display is in standby mode ("off") or is in an active mode ("on"). Based upon the determined state of the display device, the lens of the video camera is either blocked or unblocked by the ASCS.

Different makes and models of electronic displays have vastly different standby mode power consumptions and active model power consumptions. For example, the active mode power consumption of one display may be less than the standby model power consumption of another display. Therefore, the ASCS needs to be able to flexibly identify a display's mode across varying power usage levels. To do so, various arrangements detailed herein can be employed, such as: a data store that maps particular makes and models to defined threshold values; a training process in which an end user sets the display device to each mode to allow the APSCS to calculate a threshold; or a learning process where use of the display device is monitored for a period of time to determine a threshold.

Once a threshold has been determined, based on whether power consumption of the display device is above or below the threshold, the shutter is actuated to a closed position (obscuring the camera) or an open position (allowing the camera to view the ambient environment). Detail regarding these embodiments and other variations are provided in relation to the figures.

Figure 1A:
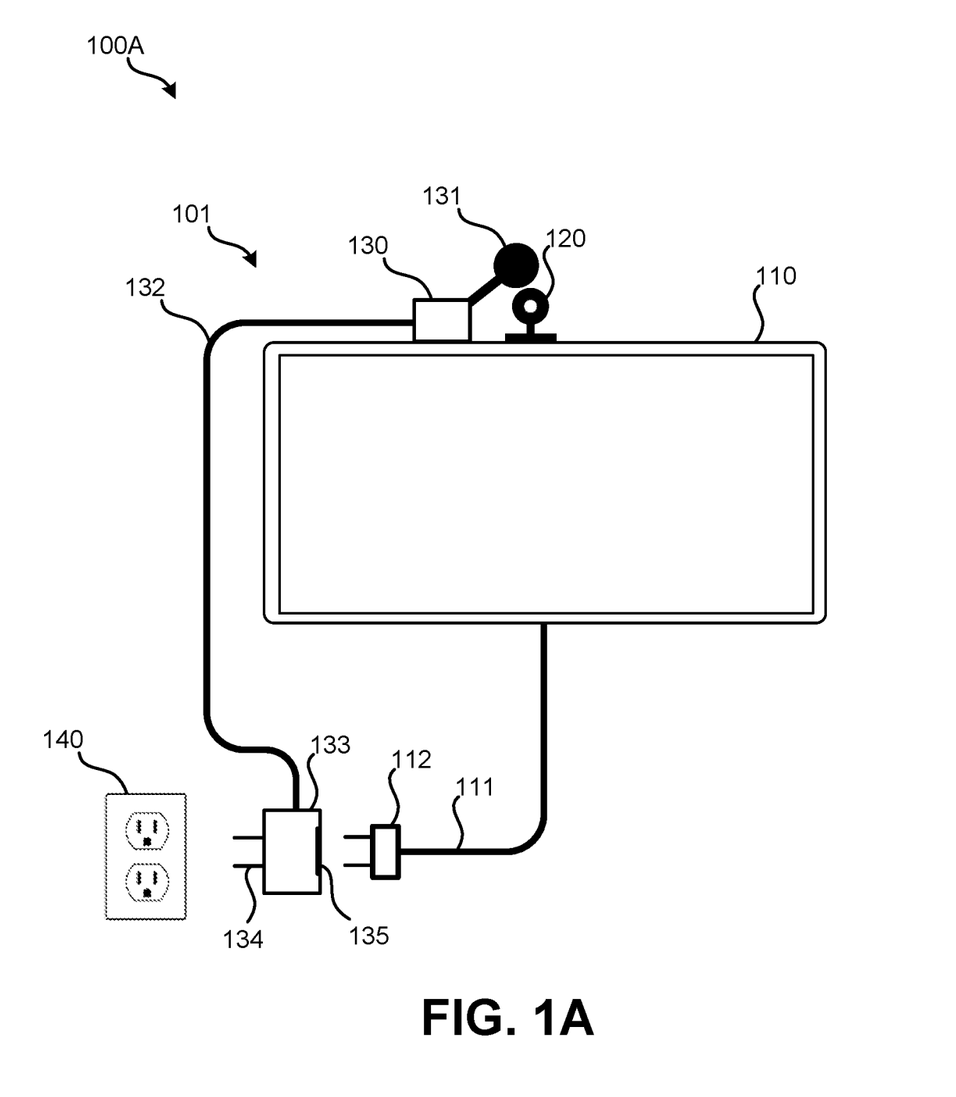
FIG. 1A illustrates an embodiment of an automated privacy shutter control system being used in conjunction with a display being used in conjunction with a separate video camera.

FIG. 1A illustrates an embodiment 100A of ASCS 101. Embodiment 100A includes display 110 being used in conjunction with a separate and distinct video camera 120 (hereinafter "camera 120"). Embodiment 100A can include: display 110; power cable 111; plug 112; camera 120; shutter control unit 130; shutter 131; cable 132; power system 133; plug 134; socket 135; and outlet 140.

Display 110 may be various forms of an electronic display. Display 110 can be a television, monitor, desktop or laptop screen, gaming device, or some other form of electronic device with which a camera may be used in conjunction. Such uses can involve video conferencing, gaming, exercising (e.g., group participation in exercise classes or challenges), streaming, webcasting, and presentations.

Display 110 requires power to operate. Display 110 uses power cable 111 to receive power. Power cable 111 includes plug 112, which is shaped to connect with a socket of a power outlet. The specific shape of plug 112 can vary by jurisdiction.

Most end users think of display as functioning in two modes: on and off. Most displays, such as display 110, do not have a completely off mode, since display 110 needs to be ready to respond to a command from a remote device such as a remote control. Rather, display 110 can function in a standby mode or an active mode. "Standby mode" refers to a mode where the display screen of display 110 is deactivated and power consumption is relatively lower than in "active mode." "Active mode" refers to a mode where the display screen of display 110 is in use (e.g., an image or video presented) and the power consumption is relatively higher than in the "standby mode." From the perspective of an end user, standby mode is equivalent to a "power off" mode and active mode is equivalent to a "power on" mode.

The specific power usage of a given display make and model can vary significantly between standby and active mode. Further, differences in power usage among different makes and even different models of the same make exist between active mode and standby mode. Further detail about the varying power usages of different makes and models is provided in relation to FIG. 4. The variance in power usage may be due to design choices made by the manufacturer, the type of display (e.g., OLED, LCD, plasma), and which components are disabled in standby mode in addition to the display screen.

Camera 120 is typically a video camera; however, a camera capable of capturing only discrete still images is also possible. In FIG. 1A, camera 120 is a separate and discrete device that can be placed irrespective of the location of display 110. In this example, a user has placed camera 120 atop display 110. Camera 120 may have its own power cable, which may be integrated along with a data cable, such as in the form of a universal serial bus (USB) cable. Camera 120 may or may not have a shutter, such as a mechanical shutter, that is either controlled automatically by circuitry of camera 120 or can be manually actuated by a user.

ASCS 101 can include: shutter control unit 130; shutter 131; cable 132; and power system 133. Referring first to power system 133, power system 133 can be configured to serve as a power pass-through. Display 110 can receive power through power system 133. Power system 133 can have socket 135 into which plug 112 of display 110 is configured to be inserted. Power system 133 can further have plug 134 which is configured to be plugged into a power source, such as outlet 140. Outlet 140 is typically part of a household (or building) wiring system that receives power from a local power grid or possibly a household solar system. From the perspective of display 110, power is received just as if plug 112 was plugged directly into outlet 140.

Power system 133 can serve two functions: 1) deliver power to shutter control unit 130; and 2) sense the amount of power being consumed by display 110. Power system 133 includes power sensing circuitry 242, which is detailed in relation to FIGS. 2 and 3. An indication of the amount of power consumed (or an equivalent value, such as a measured current) can be provided to shutter control unit 130 via cable 132. Based on the indication, componentry of shutter control unit 130 physically moves shutter 131 between at least two distinct positions. When display 110 is determined to be in standby mode, shutter 131 is positioned to obscure (e.g., fully obscure) the field-of-view of a lens of camera 120. When display 110 is determined to be in an active mode, shutter 131 is positioned to allow the lens of camera 120 to fully view its field-of-view. An example of a position in which shutter 131 does not obscure the lens of camera 120 is illustrated in FIG. 1A.

ASCS 101 can be separate and distinct from camera 120. Rather, the automated shutter control system uses the state of display 110 to determine a shutter position, which effectively blocks or allows for use of camera 120.

The specific positions used for blocking and unblocking the lens of camera 120 can be configurable. That is, based on how ASCS 101 is positioned relative to camera 120, the position used for blocked and the position used for unblocked can be set by a user. In some embodiments, a user may manually move shutter 131 to the desired blocked position, which is then stored or otherwise retained for future use as the blocked position. Similarly, a user may manually move shutter 131 to the desired unblocked position, which is then stored or otherwise retained for future use as the unblocked position.

Figure 1B:
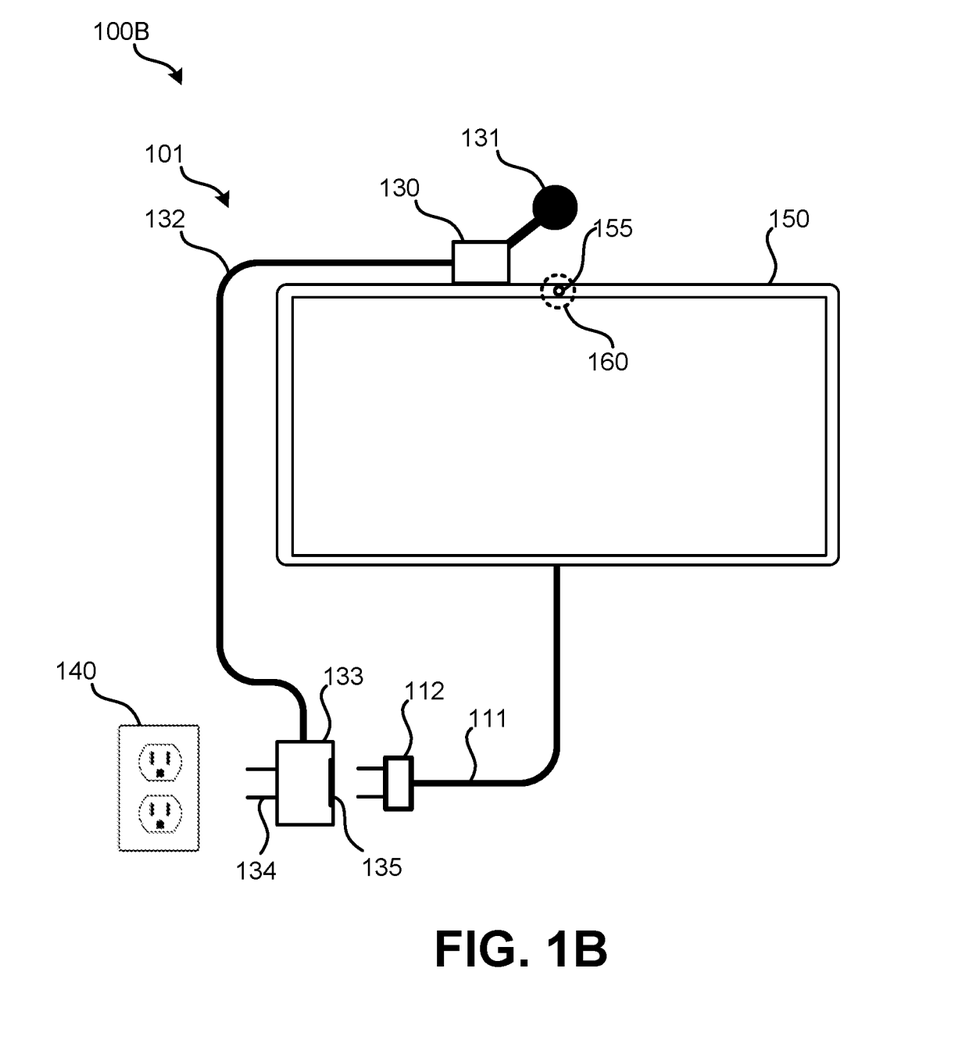
FIG. 1B illustrates an embodiment of an automated privacy shutter control system being used in conjunction with a display having an integrated video camera.

While FIG. 1A is focused on a camera that is separate and distinct from the display, FIG. 1B is focused on a camera that is integrated with a display. FIG. 1B illustrates an embodiment 100B of ASCS 101 being used in conjunction with display 150 which has an integrated video camera 155. Camera 155 may or may not have a mechanical shutter that is either controlled automatically by the circuitry of camera 155 or can be manually actuated by a user. Even if such a shutter is present, ASCS 101 may be worthwhile for an end user to install because a manual shutter may be inadvertently left open by the end user and an automated shutter may be surreptitiously controlled by an unauthorized party via a network. Such control of ASCS 101 may not be possible: ASCS 101 may not have any network connection and may only actuate based on the power usage of the display and, possibly, some other arrangement that is limited to local control, such as an infrared or RF remote control.

Similar to embodiment 100A, embodiment 100B involves power (or some proxy, such as current) usage of display 150 that is sensed using power sensing circuitry of ASCS 101. Rather than using shutter 131 to obscure a separate camera, shutter 131 is used to block and unblock integrated camera 155. In embodiment 100B, based on how ASCS 101 is positioned relative to camera 155, the position used for blocking camera 155 varies from the position used for blocking camera 120 in embodiment 100A. As previously detailed, a user may manually move shutter 131 to the desired blocked position, such as position 160, which is then stored or otherwise retained for future use as the blocked position. Similarly, a user may manually move shutter 131 to the desired unblocked position, which is then stored or otherwise retained for future use as the unblocked position. In other embodiments, the blocked and unblocked positions may be set electronically by the user.

The specific size and shape of shutter 131 can be varied by embodiment. A relatively small size for shutter 131 may be needed due to the close proximity to the lens of camera 155 or camera 120. In some embodiments, rather than having plug 134 directly integrated with power system 133, a power cord may connect plug 134 to power system 133. Additionally or alternatively, socket 135 may be located at an end of a power cord which is connected to power system 133. In some embodiments, power may not be delivered to shutter control unit 130 via cable 132. Either a separate cable may be used or an alternative power source, such as a battery, may be used by shutter control unit 130.

A variation on ASCS 101 can involve sensing light rather than power usage. A light sensor of ASCS 101 may be aimed toward display 110. Based on determining an amount of light emitted by display 110, a similar determination can be made as to whether display 110 is in an active mode or is in standby mode.

Figure 2:
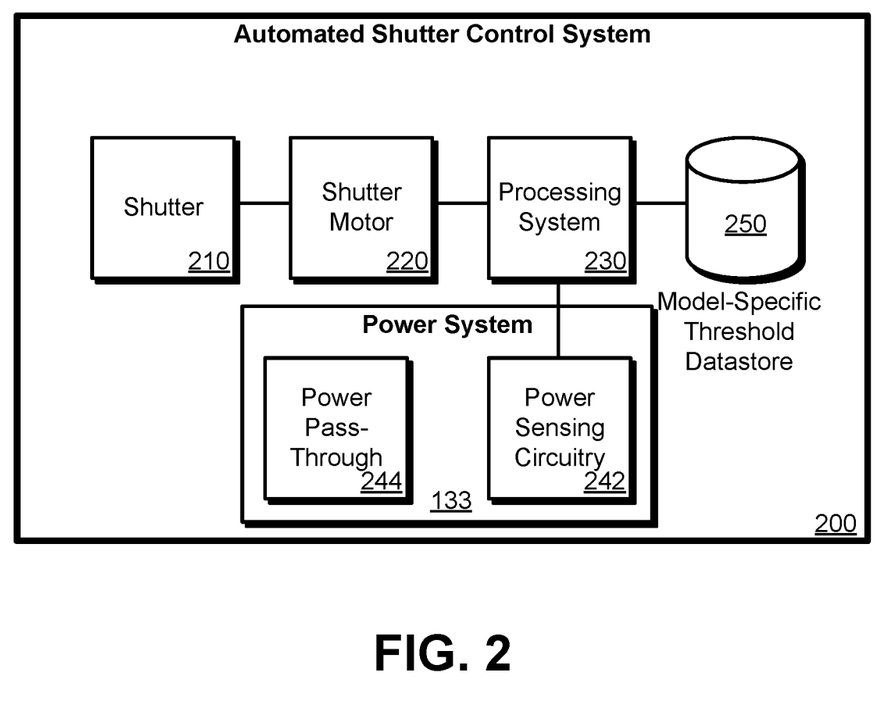
FIG. 2 illustrates a block diagram of an embodiment of an automated shutter control system.

FIG. 2 illustrates a block diagram of an embodiment of an ASCS. ASCS 200 of FIG. 2 can represent a block diagram of ASCS 101 of FIGS. 1A and 1B. ASCS 200 includes: shutter 210; shutter motor 220; processing system 230; power system 133; and model-specific threshold datastore 250.

Shutter 210 may be a rigid or semi-rigid piece of non-transparent material, such as made of plastic, rubber, or metal, that is movable by shutter motor 220. Shutter motor 220 is capable of physically moving shutter 210 between at least two positions, one of which blocks a lens of a camera and one of which does not block the lens of the camera. Shutter motor 220 may be housed as part of the shutter control unit 130 as indicated in FIGS. 1A and 1B.

Shutter motor 220 can be in communication with and controlled by processing system 230. Processing system 230 may, at minimum, include circuitry that can output a signal based on the amount of power or equivalent measured by power sensing circuitry 242. Processing system 230 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Power system 133 can include: power pass-through 244 and power sensing circuitry 242. Power pass-through 244 allows for power received via plug 134 to be passed through to socket 135, thus allowing a display that is plugged in to receive power. Power pass-through 244 can include conductive connections between plug 134 and socket 135. Intervening circuitry of power sensing circuitry 242 can be present. Power sensing circuitry 242 can allow for a power usage at socket 135 or current through power pass-through 244 to socket 135 to be measured. An indication of the power or current can be transmitted by power sensing circuitry 242 to processing system 230 (e.g., via cable 132) when processing system 230 is installed within shutter control unit 130. In other embodiments, processing system 230 can be installed within power system 133. In such embodiments, a signal can be sent by processing system 230 via cable 132 to control shutter motor 220.

Figure 4:
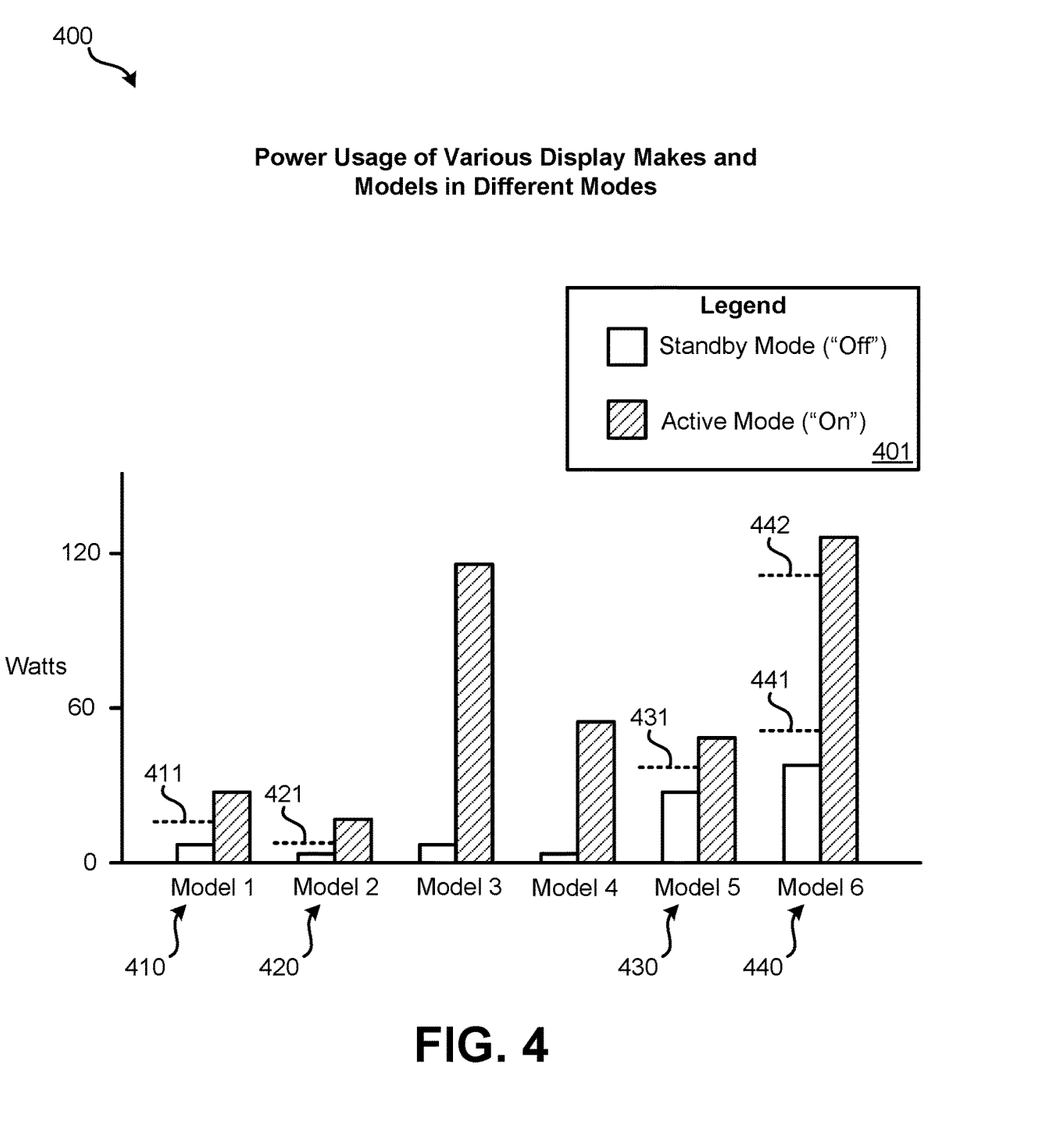
FIG. 4 illustrates a graph of the power usage of different makes and models of displays by mode.

Notably, the amount of power used by certain makes and models of displays varies substantially between modes. FIG. 4 illustrates a graph 400 of the power usage of different makes and models of displays by mode. Notably, certain makes and models of displays may use more power in standby mode than other makes and modes use in an active mode. Therefore, using a single threshold across all makes and models of displays may not allow ASCS 101 to be used with all displays. Rather, a threshold current or power usage specific to a display make and/or model may need to be used to ensure a camera is blocked and unblocked according to whether the display is in standby or active mode.

FIG. 4 indicates how the amount of power consumed by different makes and models (including different models of the same manufacturer) can exhibit substantially different power usage. The various models of FIG. 4 can be indicative of different makes, different models of the same make (manufacturer), or some variation thereof. For example, model 410 uses more power in standby mode and active mode than model 420. However, model 410 uses less power in active mode than model 440 uses in standby mode. Similarly, model 420 uses less power in active mode than model 430 in standby mode. Accordingly, a one-size-fits-all threshold may not be used for determining the mode in which a display is operating.

For each model illustrated, a different threshold may be used to determine the state. For example, threshold 411 may be suitable for model 410, but threshold 431, which is substantially greater than threshold 411, may be used for model 430. Similarly, threshold 421 may be used for model 420, which would not work for either model 410, model 430, or model 440.

In some embodiments, multiple thresholds may be used. For example, for model 440, to indicate a transition from standby mode to active mode, threshold 442 may need to be exceeded. However, to indicate a transition from active mode to standby mode, the power consumption may be required to drop below threshold 441. The use of hysteresis and multiple thresholds may increase the accuracy of the state determination by an automated shutter control system.

Returning to FIG. 2, a model-specific threshold datastore may be stored locally by ASCS 200 or otherwise may be accessible (e.g., via a network connection). A user may indicate the make and model of display which is connected with power pass-through 244. The user may provide this information via a user input component (not shown), such as a keyboard, buttons, knob, touchscreen, etc., of ASCS 200 or via a network connection (e.g., a Bluetooth connection between ASCS 200 and a computerized device of the user). Based on the make and model information provided, a lookup is performed by processing system 230 in model-specific threshold datastore 250. One or more thresholds that can be used to determine the model of the display connected with power pass-through 244 are obtained. Processing system 230 can then use these one or more thresholds to determine the mode of the connected display, which is then used to control shutter motor 220 and, thus, the position of shutter 210.

Figure 3:
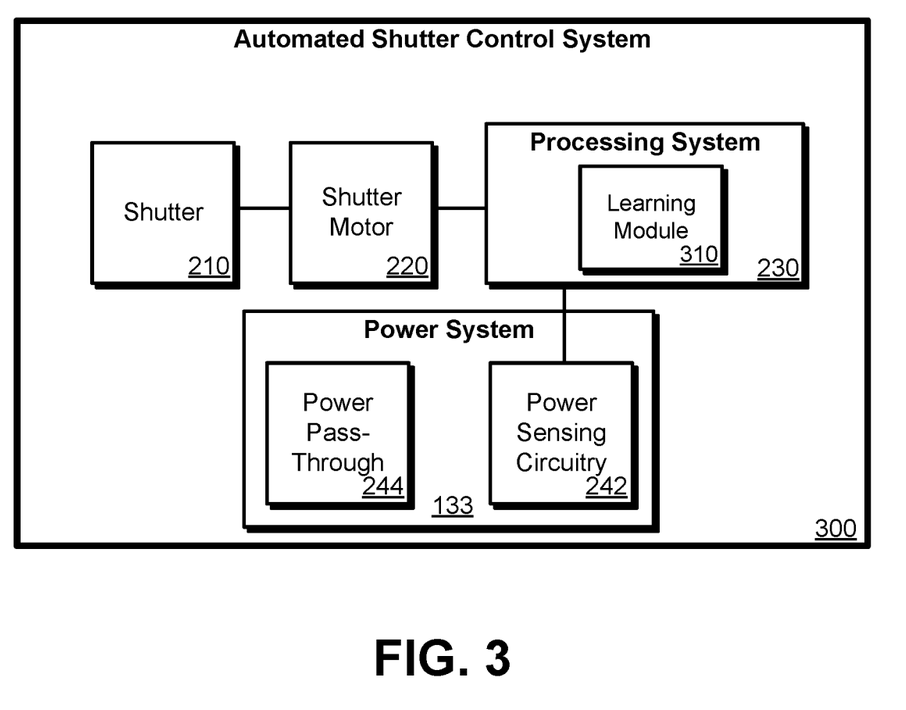
FIG. 3 illustrates a block diagram of another embodiment of an automated shutter control system.

The thresholds stored to model-specific threshold datastore 250 can be defined by a manufacturer of ASCS 300. For example, the manufacturer of ASCS 300 may test a number of displays such that customized thresholds are defined for common makes and models of displays.

Arrangements that use arrangements other than a model-specific threshold datastore 250 can be used. FIG. 3 illustrates a block diagram of an embodiment of ASCS 300 that uses learning module 310 in lieu of model-specific threshold datastore 250. Other components of ASCS 300 function as detailed in relation to FIG. 2.

When a display is connected with power pass-through 244, learning module 310 may monitor for a period of time. During this period of time, many samples of power being supplied to the display via power pass-through 244 may be monitored. A clustering algorithm may be applied to cluster samples into two groups. A first, lower-power group corresponds to standby mode; a second, higher-power group corresponds to active mode of the display. Once the period of time has elapsed, one or more thresholds may be calculated. For example, a mean value, representing a power level equidistant between the first group and the second group can be used as the threshold (such as illustrated for threshold 431 of FIG. 4). Alternatively, multiple thresholds may be calculated such as 20% above and below the first group and the second group, respectively, to incorporate hysteresis as detailed in relation to threshold 441 and threshold 442 of FIG. 4. Use of this arrangement may not involve a user having to perform any specific steps other than connecting the display with power pass-through 244 and using the display normally.

In another arrangement, a user may actively participate in a setup process. After a display is connected with power pass-through 244, a user may be instructed to cycle the display's power such that it is in active mode for a period of time, then in stand-by mode for a period of time (or the reverse). One or more measurements may be taken by learning module 311 via power sensing circuitry 242 to determine power usage (or some equivalent) for each of the display's modes. A threshold may then be calculated as previously detailed.

A reset button or other form of user input arrangement may be present such that learning module 310 may be retrained when a different display is connected with power pass-through 244.

Figure 5:
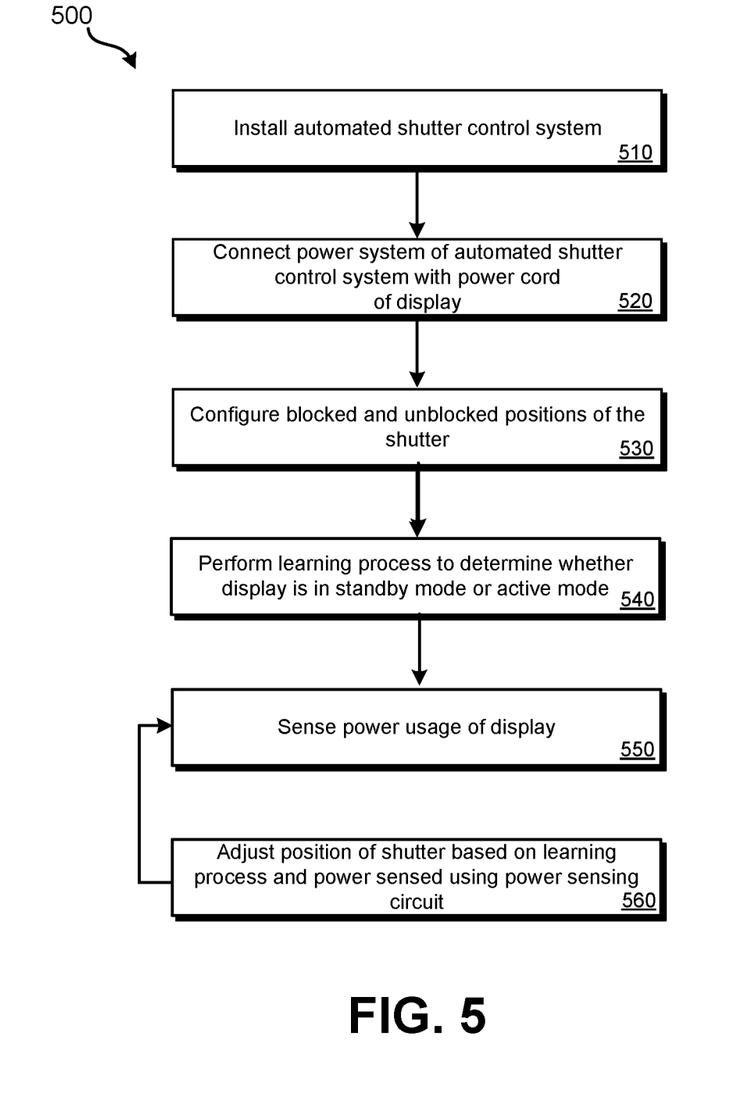
FIG. 5 illustrates an embodiment of a method for initially setting up and using an automated privacy shutter control system in conjunction with a camera and display.

Various methods can be performed using the systems and devices detailed in relation to FIGS. 1-3. FIG. 5 illustrates an embodiment of a method 500 for initially setting up and using an automated privacy shutter control system in conjunction with a camera and display. The camera of method 500 may be integrated with the display or may be separate and distinct. In either case, the ASCS used in method 500 is separate and distinct from the display and camera.

At block 510, the ASCS, such as ASCS 101 of FIGS. 1A and 1B, is installed. The ASCS may be connected with a power outlet and positioned such that a shutter of the ASCS is proximate to a camera that is to be blocked when a display is not in use.

At block 520, the power system of the ASCS is connected with a power cord of the display. The power cable through which the display receives power is plugged into a socket of the power system. The display receives power via the power system as if plugged into an outlet. However, the power system is able to measure power usage of the display or an equivalent value (e.g., current draw of the display). In some embodiments, rather than requiring the power cord of the display to be plugged into the power system of the ASCS, a current-sensing component may be placed in proximity to the power cord of the display.

At block 530, positions of the shutter of the ASCS may be configured. A user may manually move (or otherwise control) a position in which the shutter is set for the blocked position of the camera, the unblocked position of the camera, or both. The blocked position may vary substantially based on whether the camera is integrated with the display or separate, such as illustrated in FIGS. 1A and 1B. The one or more positions that were input may be stored by the processing system of the ASCS and used based on the determined state of the display.

At block 540, a learning process is performed to determine the mode of the connected display. In some embodiments, the learning process of block 540 involves looking up and retrieving a predefined threshold power usage value that can be used to assess whether the display is in an active mode or standby mode based on power usage. A user may be required to input an indication of the make and model to the ASCS in order to look up the correct threshold to be used. In other embodiments, a stand-alone or user-assisted training process is performed, as detailed in relation to FIG. 3.

Following block 540, the ASCS is ready for use. At block 550, power usage of the display is sensed via the power system of the ASCS. At block 560, the position of the shutter is adjusted based on the sensed power usage of the display and the performed learning process of block 540. If a user configures the blocked and unblocked positions, when the measured power is indicative of standby mode (e.g., below the retrieved or created threshold), the shutter is moved to the set blocked position; when the measured power is indicative of active mode (e.g., above a retrieved or created threshold), the shutter is moved to the set unblocked position. If user-set positions of the shutter are not used, default or fixed positions may be used instead.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. An automated shutter control system for use with a video camera, the automated shutter control system comprising:
    a shutter;
    a shutter motor that moves the shutter;
    a power system, comprising:
        a power pass-through, comprising:
            a socket configured to be connected with a power cable plug of an electronic display;
            a plug configured to be connected with an outlet through which power is received for the automated shutter control system and the electronic display; and
        power sensing circuitry, comprising:
            a circuitry that measures an amount of power being supplied to the electronic display; and
    a processing system, comprising one or more processors, that is in communication with the shutter motor and the power sensing circuitry, wherein the processing system is configured to:
        based on the amount of power being supplied to the electronic display as measured by the circuitry of the power sensing circuitry, transmit a signal to the shutter motor that causes the shutter to be actuated to an unblocked position or a blocked position.

2. The automated shutter control system of claim 1, wherein the shutter, when in the blocked position, blocks a camera lens of the video camera, the video camera being separate and distinct from the automated shutter control system.

3. The automated shutter control system of claim 2, wherein the shutter, when in the unblocked position, permits the camera lens of the video camera a field of view unobstructed by the shutter.

4. The automated shutter control system of claim 1, wherein the processing system is further configured to:
   receive an indication of a make and a model of the electronic display; and
   access a data store to retrieve a threshold value mapped to the make and the model of the electronic display.

5. The automated shutter control system of claim 4, wherein the processing system is further configured to:
   compare the retrieved threshold value with the amount of power being supplied to the electronic display; and
   transmit the signal to the shutter motor that causes the shutter to be actuated to the unblocked position or the blocked position further based on comparing of the amount of power 6 with the retrieved threshold value mapped to the make and the model of the electronic display.

6. The automated shutter control system of claim 5, wherein the amount of power is required to exceed or not exceed the retrieved threshold value for a predefined duration of time prior to the signal being transmitted to the shutter motor that causes the shutter to be actuated.

7. The automated shutter control system of claim 1, wherein the processing system is further configured to:
   perform a learning process that comprises:
      monitoring a power usage of the electronic display for at least a defined period of time; and
      determining an active power usage value and a standby power usage value for the electronic display based on monitoring the power usage for at least the defined period of time.

8. The automated shutter control system of claim 7, wherein the processing system is further configured to:
   calculate a threshold value using the determined active power usage value and the determined standby power usage value;
   compare the calculated threshold value with the amount of power being supplied to the electronic display; and
   transmit the signal to the shutter motor that causes the shutter to be actuated to the unblocked position or the blocked position further based on comparing of the amount of power with the calculated threshold value.

9. The automated shutter control system of claim 1, wherein the processing system is further configured to:
   perform a learning process configured to:
      cause an end user to set the electronic display to an active mode;
      measure active power usage while the electronic display is set to the active mode;
      cause the end user to set the electronic display to a standby mode;
      measure standby power usage while the electronic display is set to the standby mode; and
      calculate a threshold value using the measured active power usage value and the measured standby power usage value.

10. The automated shutter control system of claim 9, wherein the processing system is further configured to:
   compare the calculated threshold value with the amount of power being supplied to the electronic display; and
   transmit the signal to the shutter motor that causes the shutter to be actuated to the unblocked position or the blocked position further based on comparing of the amount of power with the calculated threshold value.

11. The automated shutter control system of claim 1, wherein the electronic display is a television, the television being separate and distinct from the video camera and separate and distinct from the automated shutter control system.

12. A method for setting up and using an automated privacy shutter control system in conjunction with a camera and display, the method comprising:
   installing an automated shutter control system such that a plug of the automated shutter control system is connected with an outlet through which power is received for the automated shutter control system and the display, wherein the automated shutter control system comprises:
      a shutter;
      a shutter motor that moves the shutter;
      a power system, comprising:
         a power pass-through, comprising:
            a socket configured to be connected with a power cable plug of the display; and
         power sensing circuitry, comprising:
            a circuitry that measures an amount of power being supplied to the display; and
   connecting the socket of the automated shutter control system with the plug of a power cable of the display;
   performing, by the automated shutter control system, a learning process to determine whether the display is in a standby mode or an active mode;
   after performing the learning process, sensing a power usage of the display; and
   adjusting a position of the shutter of the automated shutter control system based on the learning process and the sensed power usage of the display.

13. The method of claim 12, wherein the learning process comprises:
   receiving an indication of a make and a model of the display; and
   accessing a data store to retrieve a threshold value mapped to the make and the model of the display.

14. The method of claim 13, further comprising:
   comparing the retrieved threshold value with the sensed power usage.

15. The method of claim 14, wherein adjusting the position of the shutter comprises:
   transmitting a signal to the shutter motor that causes the shutter to be actuated to an open position or a closed position further based on comparing the sensed power usage with the retrieved threshold value mapped to the make and model of the display.

16. The method of claim 15, wherein the sensed power usage is required to exceed or not exceed the retrieved threshold value for a predefined duration of time prior to the signal being transmitted to the shutter motor.

17. The method of claim 12, wherein the learning process comprises:
   causing an end user to set the display to the active mode;
   measuring active power usage while the display is set to the active mode;
   causing the end user to set the display to the standby mode;

measuring standby power usage while the display is set to the standby mode; and calculating a threshold value using the measured active power usage value and the 6 measured standby power usage value.

18. The method of claim 12, further comprising:

configuring a blocked shutter position in which the shutter blocks a field of view of the camera and an unblocked shutter position in which the shutter does not block the field of view of the camera.

19. The method of claim 12, wherein the camera is separate and distinct from the automated shutter control system.

20. The method of claim 19, wherein the camera is integrated as part of the display.

* * * * *